(12) United States Patent
Zhang (10) Patent No.: US 11,303,350 B2
(45) Date of Patent: Apr. 12, 2022

(54) METHOD AND SYSTEM FOR ELECTROMAGNETIC WAVE DATA TRANSMISSION

(71) Applicant: XUZHOU SPACE-TIME THOUGHT INTELLIGENT TECHNOLOGY CO., LTD, Xuzhou (CN)

(72) Inventor: Lianke Zhang, Xuzhou (CN)

(73) Assignee: XUZHOU SPACE-TIME THOUGHT INTELLIGENT TECHNOLOGY CO., LTD, Xuzhou (CN)

( * ) Notice: Subject to any disclaimer, the term of this patent is extended or adjusted under 35 U.S.C. 154(b) by 0 days.

(21) Appl. No.: 17/054,527

(22) PCT Filed: Aug. 23, 2019

(86) PCT No.: PCT/CN2019/102238
§ 371 (c)(1),
(2) Date: Nov. 11, 2020

(87) PCT Pub. No.: WO2020/052427
PCT Pub. Date: Mar. 19, 2020

(65) Prior Publication Data
US 2021/0119693 A1    Apr. 22, 2021

(30) Foreign Application Priority Data
Sep. 13, 2018  (CN) .......................... 201811065508.4

(51) Int. Cl.
*H04B 7/185* (2006.01)
(52) U.S. Cl.
CPC ................. *H04B 7/1851* (2013.01)

(58) Field of Classification Search
CPC ............ H04B 7/18504; H04B 7/18515; H04B 7/18517; H04B 7/18521; H04B 7/1851;
(Continued)

(56) References Cited

U.S. PATENT DOCUMENTS

2012/0179810 A1* 7/2012 Contreras Delpiano ...................
H04W 48/18
709/224
2016/0269100 A1    9/2016 Welle
(Continued)

FOREIGN PATENT DOCUMENTS

| CN | 105553540 A | 5/2016 |
|---|---|---|
| CN | 106685516 A | 5/2017 |

(Continued)

*Primary Examiner* — Keith Ferguson
(74) *Attorney, Agent, or Firm* — Bayramoglu Law Offices LLC (57) ABSTRACT

A system for electromagnetic wave data transmission, including a ground main information node, a communication satellite, a relay satellite, an uplink control carrier, and a relay satellite antenna unit. The ground main information node is connected to an external network by a broadband cable; and the ground main information node is connected to the communication satellite by the relay satellite. The communication satellite includes a service range of the communication satellite, and the communication satellite is separately connected to a plurality of mobile terminals and a ground data collection node. The mobile terminals and the ground data collection node are arranged within the service range of the communication satellite. The mobile terminals include data collection nodes; additionally, the ground data collection node is arranged within a service range of the ground data collection node.

17 Claims, 8 Drawing Sheets

(58) Field of Classification Search
CPC .......................... H04B 7/18571; H04B 7/185;
H04B 7/18508; H04B 7/155; H04B
7/18578; H04B 7/18523; H04B 7/18528;
H04B 7/1853
See application file for complete search history.

(56) References Cited

U.S. PATENT DOCUMENTS

2017/0134987 A1\* 5/2017 Halepovic ............ H04N 21/262
2018/0013486 A1\* 1/2018 Irani ...................... H04B 7/195

FOREIGN PATENT DOCUMENTS

| CN | 105634564 B | 7/2018 |
| CN | 108494472 A | 9/2018 |
| CN | 109217914 A | 1/2019 |

\* cited by examiner

METHOD AND SYSTEM FOR ELECTROMAGNETIC WAVE DATA TRANSMISSION

CROSS REFERENCE TO THE RELATED APPLICATIONS

This application is the national phase entry of International Application No. PCT/CN2019/102238, filed on Aug. 23, 2019, which is based upon and claims priority to Chinese Patent Application No. 201811065508.4, filed on Sep. 13, 2018, the entire contents of which are incorporated herein by reference.

TECHNICAL FIELD

The present invention relates to the technical field of wireless transmission, and in particular to a method and a system for electromagnetic wave data transmission.

BACKGROUND

The invention patent CN201510958059.6 disclosed a method and system of electromagnetic wave analog digital high-level system transmission. The system includes a data protocol building module, a binary data and high-level data analog conversion module, a high-level data distribution electromagnetic wave band module, and a wide band electromagnetic wave transmitting and receiving module. The binary data and high-level data analog conversion module includes a first instruction storage unit, a data analysis unit, and a data code adding/subtracting output unit. The high-level data distribution electromagnetic wave band module includes a second instruction storage unit, a high-level code storage unit, an electromagnetic wave band data corresponding code storage unit, and a comparative data input and output unit. The computer binary data is divided into equal parts and converted into ternary and the above analog high system data, the electromagnetic wave band paired with analog high-level data is transmitted with the shortest number oscillation cycle, then reverse decoded and restored to binary data. The advantages of the technology disclosed in prior art, patent CN201510958059.6, is that the signal interference is small, energy consumption is low, data transmission volume is large, and security is strong. However, prior art patent CN201510958059.6 only discloses the most basic transmission principles and methods, it does not disclose or teach the specific large-scale transmission principles, specific methods of protocol establishment, uplink rules of large-scale terminal data, and the principle of further improving data transmission speed.

SUMMARY

The objective of the present invention is to provide a method and a system for electromagnetic wave data transmission to solve the problems raised in the above-mentioned background.

In order to achieve the above-mentioned objective, the present invention provides the following technical solution: a method and a system for electromagnetic wave data transmission includes a ground main information node, a communication satellite, a relay satellite, an uplink control carrier and a relay satellite antenna unit. The ground main information node is connected to an external network via a broadband cable, and the ground main information node is connected to the communication satellite through the relay satellite. The communication satellite includes a service range of the communication satellite, and the communication satellite is separately connected to mobile terminals and a ground data collection node. The mobile terminals and the ground data collection node are arranged within the service range of the communication satellite. The mobile terminals include data collection nodes, and the ground data collection node is arranged within the service range of the ground data collection node.

As a further solution of the present invention, the communication satellite emits uniform data electromagnetic waves and the uplink control carrier to all mobile terminals, additionally, the communication satellite also emits an independent combination of electromagnetic waves to the ground data collection node and receives independent uplink data electromagnetic waves that are emitted by the ground data collection node.

As a further solution of the present invention, the ground data collection node not only uses the independent combination of the electromagnetic waves to emit the electromagnetic waves to the terminal, but also uses an independent uplink control carrier chain to control uplink data of the mobile terminals within the service range of the ground data collection node. At the same time, after receiving data from the mobile terminals, the ground data collection node uses an independent set of electromagnetic waves to emit the data to the communication satellite. The mobile terminals spontaneously form the data collection nodes, which emits the data from satellite to all terminals. The data collection nodes only receive the uplink data of the terminal served and uses the independent set of electromagnetic waves to transmit the uplink data to the satellite after aggregation.

As a further solution of the present invention, the relay satellite antenna unit externally receives the electromagnetic waves; the relay satellite antenna unit includes an antenna, an electromagnetic oscillation circuit, a detection and control unit, and an electromagnetic signal transmission wire of the electromagnetic oscillation circuit.

As a further solution of the present invention, the relay satellite antenna unit is connected to the detection and control unit through the electromagnetic oscillation circuit. Electromagnetic oscillation circuits in two of the relay satellite antenna units are connected by the electromagnetic signal transmission wire of the electromagnetic oscillation circuit. The relay satellite antenna unit directly imports electromagnetic wave signal data received by a receiving antenna into a signal input end of a resonant circuit of a emitting antenna, uses a new type of receiving electromagnetic wave direct conversion and control emitting electromagnetic wave circuit, and a relay signal is directly converted into another set of electromagnetic waves. Therefore, the data security is strengthened again, and can be utilized in both relay mode and base station mode.

As a further solution of the present invention, the uplink control carrier chain is used to control an uplink sequence of each terminal. The uplink control carrier chain is composed of an electromagnetic wave which is always circularly emitted with a fixed frequency, a fixed wavelength, and an adjustable amplitude. The uplink control carrier chain is modulated into various amplitude waveforms by a modem. Each modulated waveform is an uplink time period of one terminal with a specific waveform representing the start of a period. And a specific waveform is also used to represent the registration period and the cycle termination period. An adaptive method is used to increase the data and length of the carrier chain according to the number of the terminals.

As a further solution of the present invention, the uplink control carrier chain includes a modulated waveform, an increased or decreased uplink time interval waveform resulted from the distance between the terminal and the satellite, a special waveform at the end of the carrier chain, a registration time interval waveform, an uplink lag time period, an uplink data electromagnetic wave chain of the mobile terminals, a reduced time interval waveform, an extended time interval waveform, and a demodulated waveform. The time axis of the uplink control carrier chain is a horizontal axis, and the uplink control carrier is arranged with the modulated waveform. The modulated waveform, the time interval waveform that increases or decreases due to the distance between the terminal and the satellite is set between modulated waveforms, and the waveforms of all uplink data carriers are connected to the end special waveform of the carrier chain. The special waveform at the end of the chain has a waveform of the registration time interval. The registration time interval waveform is arranged after the special waveform at the end of the carrier chain. The mobile terminals receive and synchronously demodulate the uniform data uplink time lag caused by the uplink control carrier waveform and form the uplink lag time period. After the uplink lag time period, the uplink data electromagnetic wave chain of the mobile terminals is set. The reduced time interval waveform, which is allocated by the satellite modulation due to low volume of uplink data, and the time interval waveform, which is allocated by the satellite modulation due to increase of the uplink data volume, are set above the synchronously demodulated waveform; the demodulated waveform is set below the uplink control carrier.

As a further solution of the present invention, a set of electromagnetic waves is used to perform a position reference to the unit length data on the data link. Without adding too much data electromagnetic waves, it completely avoids the difficulty in detection caused by the cancellation of the peak and valley of the waves when the electromagnetic waves are superimposed and launched.

As a further solution of the present invention, multiple sets of accompanying waves are used, including multiple sets of temporary accompanying waves to ensure that the peak and valley of the accompanying waves are canceled when the accompanying waves are superimposed and launched. Continuous emission of the equal number will cause peak and valley cancellation detection difficulties. Thus, a combination of small accompanying waves is used to reject the combination data of the accompanying waves that cannot be emitted in the group emission.

As a further solution of the present invention, when a data emission center receives the data to be sent to multiple terminals, the data enters a first storage unit through a data inflow port for temporary storage. The data size in the first storage unit is automatically allocated according to the number of terminals owned and the respective data volume. A data access module is controlled by an integrated data access module by a control circuit, and the data access module is responsible for acquiring a certain amount of data of all the terminals. The terminal data volume in the second storage unit is of a uniform size. In order to ensure that the data transmission speed of each terminal is about the same, the data is acquired from the first storage unit only after the terminal data transmission in the second storage unit is completed within the same cycle. The acquisition rules of the integrated data access module is set according to the priority of the time sequence. The acquired data is converted by a data and electromagnetic wave data conversion module, where it temporarily stores the converted data. At the same time, the converted data flows into an electromagnetic wave comprehensive arrangement module. The electromagnetic wave comprehensive arrangement module eliminates the same electromagnetic wave parameters according to all of the converted electromagnetic wave parameters. Only one electromagnetic wave is reserved for each type of electromagnetic wave. After aggregating all the electromagnetic wave data in the same time period according to the combination number of the accompanying electromagnetic wave data, the undesired combination is added to increase the corresponding electromagnetic wave with a small combination number. After all the electromagnetic wave data are imported into the emission module, one data transmission is completed. The electromagnetic wave comprehensive arrangement module sends interactive data to the integrated data access module, and the integrated data access module starts data acquisition again according to the data. The prevent invention integrates the single-to-single mode and single-to-multi mode in the prior art, combines the multi-terminal-to-multi-terminal data emission of the large data emission center; performs data processing at the logic level prior to comprehensive emission to make the data transmission speed of all the terminals more balanced.

Compared with the prior art, the present invention has the advantages of adding innovative uplink rules and creating a complete set of data transmission system, which not only greatly reduces the upgrading requirements of ground wireless digital base stations, but also limits the application demand for wireless spectrum bandwidth. Additionally, an innovative extreame stacking technology is used to unlimitedly stack electromagnetic wave emission cycles by using multiple antenna emission units, resulting in greater data transmission speed. The range of the reference between the electromagnetic waves and digital information is increased, solving the problem of eliminating the interference between the peak and valley of the electromagnetic waves due to the same frequency emission. The data transmission speed is greatly increased with the added emission of electromagnetic wave per unit time and the reduction of the use of different electromagnetic wave frequencies. By enabling large network data centers to use satellites to connect data directly with mobile devices in different locations, enhancing data throughput capacity, the security and confidentiality of the data center is greatly improved while its power consumption and network expenses is largely reduced.

In the drawings: 1—ground main information node, 2—communication satellite, 2001—service range of the communication satellite, 3—relay satellite, 4—mobile terminal, 4001—data collection nodes, 5—ground data collection node, 5001—service range of the ground data collection node, 6—broadband cable, 7—uplink control carrier chain, 7001—modulated waveform, 7002—uplink time interval waveform, 7003—special waveform at the end of the carrier chain, 7004—registration time interval waveform, 7005—uplink lag time period, 7006—uplink data electromagnetic wave chain of the mobile terminals, 7007—reduced time interval waveform, 7008—extended time interval waveform, 7009—demodulated waveform, 8—relay satellite antenna unit, 8001—antenna, 8002—electromagnetic oscillation circuit, 8003—detection and control unit, 8004—electromagnetic signal transmission wire of the electromagnetic oscillation circuit.

DETAILED DESCRIPTION OF THE EMBODIMENTS

The technical solutions in the embodiments of the present invention will be described clearly and completely in combination with the drawings of the embodiments of the present invention. Obviously, the described embodiments are only part of the embodiments of the present invention, not all of them. Based on the embodiments of the present invention, all other embodiments obtained by ordinary skills in the art without creative labor will fall within the protection scope of the present invention.

Figure 1:
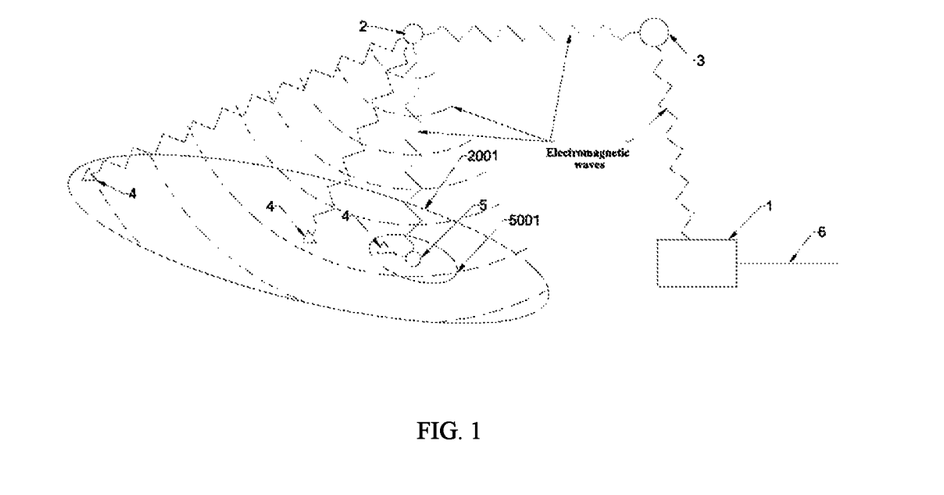
FIG. 1 is a schematic diagram of a large-scale integrated data transmission system according to the present invention.
Figure 2:
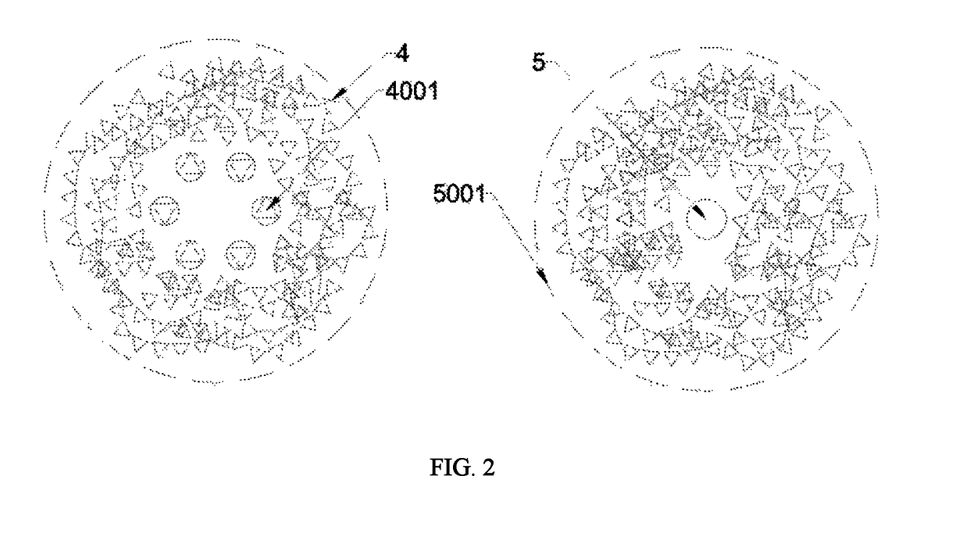
FIG. 2 is a schematic diagram of a service area of two kinds of ground data collection nodes according to the present invention.

Refer to FIGS. 1-12, one embodiment according to the present invention a method and a system for electromagnetic wave data transmission. As shown in FIG. 1 and FIG. 2, the system includes the ground main information node 1, the communication satellite 2, the relay satellite 3, the uplink control carrier chain 7, and the relay satellite antenna unit 8. The ground main information node 1 is connected to the external network by the broadband cable 6, and the ground main information node 1 is connected to the communication satellite 2 by the relay satellite 3. The communication satellite 2 includes the service range of the communication satellite 2001, and the communication satellite 2 is separately connected to the mobile terminals 4 and the ground data collection node 5. The mobile terminals 4 and the ground data collection node 5 are arranged within the service range of the communication satellite 2001. The mobile terminals 4 include the data collection nodes 4001, and the ground data collection node 5 is arranged within the service range of the ground data collection node 5001. The large-scale ground data center needs to relay signals by the relay satellite 3 to send data to the remote communication satellite 2, and the communication satellite transmits the data to the ground service area.

The ground data collection node 5 not only uses the independent combination of electromagnetic waves to emit the electromagnetic waves to the terminal, but also uses the independent carrier chain to control uplink data of the mobile terminals 4 within the service range of the communication satellite 2001. At the same time, after receiving the data from the mobile terminals 4, the ground data collection node 5 uses the independent set of electromagnetic waves to emit the data to the communication satellite 2. The mobile terminals 4 spontaneously form the data collection nodes 4001, which emits the data from satellite to all terminals 4. The data collection nodes 4001 only receive the uplink data of the terminal 4 served and uses the independent set of electromagnetic waves to transmit the uplink data to the satellite.

For the area of aggregated dense mobile terminals, a data forwarding protocol is used for data aggregation. When a certain number of terminals is reached, nodes are formed spontaneously and applied to the satellites for independent uplink data electromagnetic waves, which are used for uplink after uniformly aggregating the data of all the mobile terminals that have signed the protocol. If there are N numbers of the mobile terminals 4 in a certain aggregated area, then each of the N numbers of the mobile terminals 4 selects a plurality of the mobile terminals 4 according to its respective communication condition to form an array of the data collection nodes 4001, collects and aggregates and uploads all peripheral data. Here, when a node is formed, the node is then allocated to an independent group of high-speed data electromagnetic waves by the communication satellite 2 to ensure the data uplink to minimize data interference between the terminals. Alternatively, an independent data uplink and downlink node is utilized; this node uses an independent group of data electromagnetic waves to make the data of surrounding area converge to the node and then uplink to the communication satellite 2. The downlink data from the communication satellite 2 is simultaneously distributed to the mobile terminals 4, such as underground, buildings, trains, airplanes and other relatively electromagnetically enclosed spaces.

Figure 3:
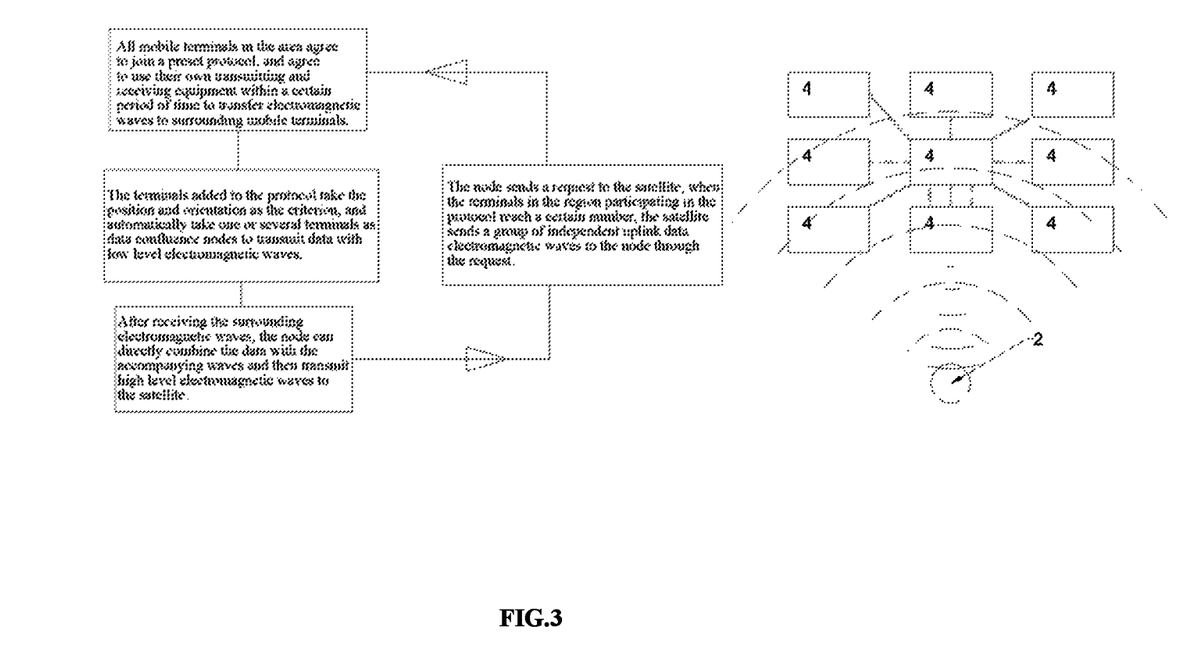
FIG. 3 is a schematic diagram of the data collection nodes spontaneously formed by mobile terminals according to the present invention.

As shown in FIG. 3, in order to reduce the energy consumption of all the mobile terminals in one area, one or several mobile terminals 4 can become the data collection nodes when using the same single electromagnetic wave forwarding protocol. The mobile terminals 4 that have signed the electromagnetic wave forwarding protocol in all regions can be compared with each other, the communication satellite 2 emits data electromagnetic waves with much lower power than the uplink data electromagnetic waves to the nodes, and only one or a few nodes emit high-power electromagnetic waves to the communication satellite 2. When the energy consumed by one node reaches certain threshold, it will be replaced by other terminals.

Figure 4:
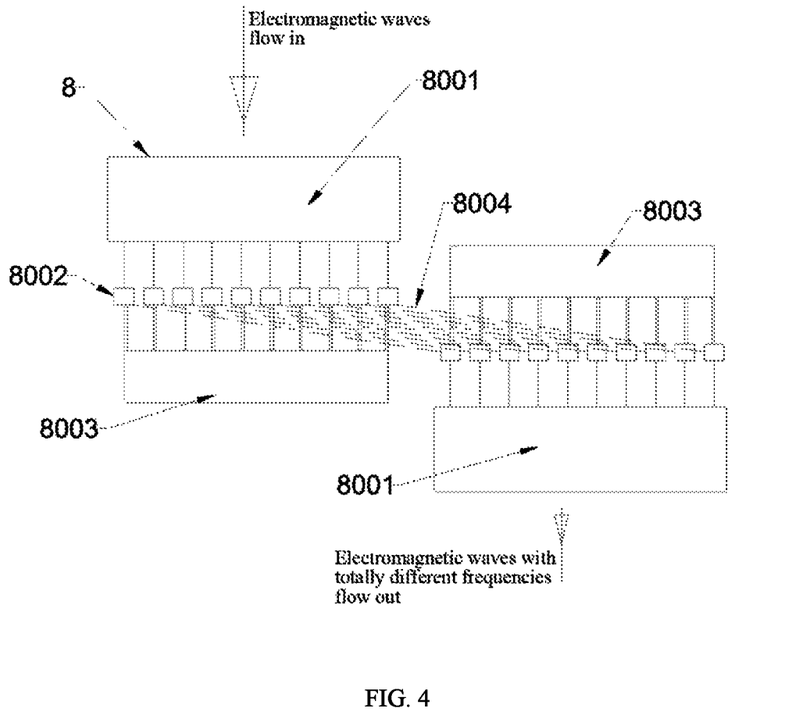
FIG. 4 is a schematic diagram showing the receiving, frequency conversion and re-emission of the electromagnetic wave on a hardware of a repeater according to the present invention.

As shown in FIG. 4, the relay satellite antenna unit 8 externally receives the electromagnetic waves; the relay satellite antenna unit 8 includes the antenna 8001, the electromagnetic oscillation circuit 8002, the detection and control unit 8003, and the electromagnetic signal transmission wire of the electromagnetic oscillation circuit 8004. The antenna 8001 is connected to the detection and control unit 8003 through the electromagnetic oscillation circuit 8002. Electromagnetic oscillation circuits 8002 in two of the relay satellite antenna units 8 are connected by the electromagnetic signal transmission wire of the electromagnetic oscillation circuit 8004, and the electromagnetic waves are converted by hardware that prevents the relay signals from interfering with each other. The electromagnetic wave signal data received by the receiving antenna is directly set to the resonant circuit as input signal input of the emitting antenna to reduce circuit delay and the energy consumption of the repeater. A new type of receiving electromagnetic wave direct conversion and control emitting electromagnetic wave circuit is used, and the relay signal is directly converted into another set of electromagnetic waves, thus the data security is strengthened again.

Figure 5:
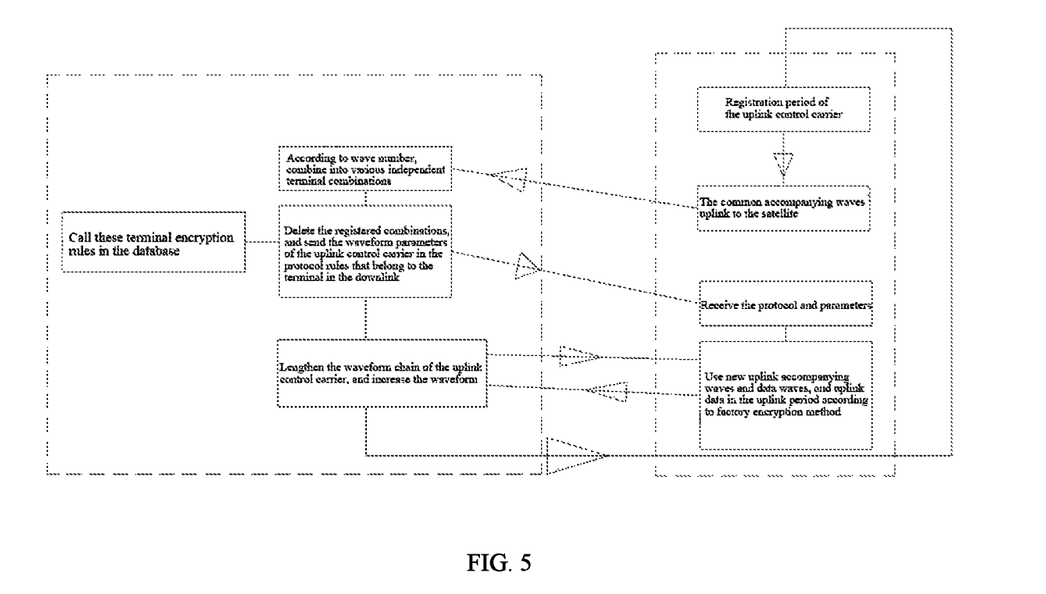
FIG. 5 is a schematic diagram of a terminal registration according to the present invention.
Figure 6:
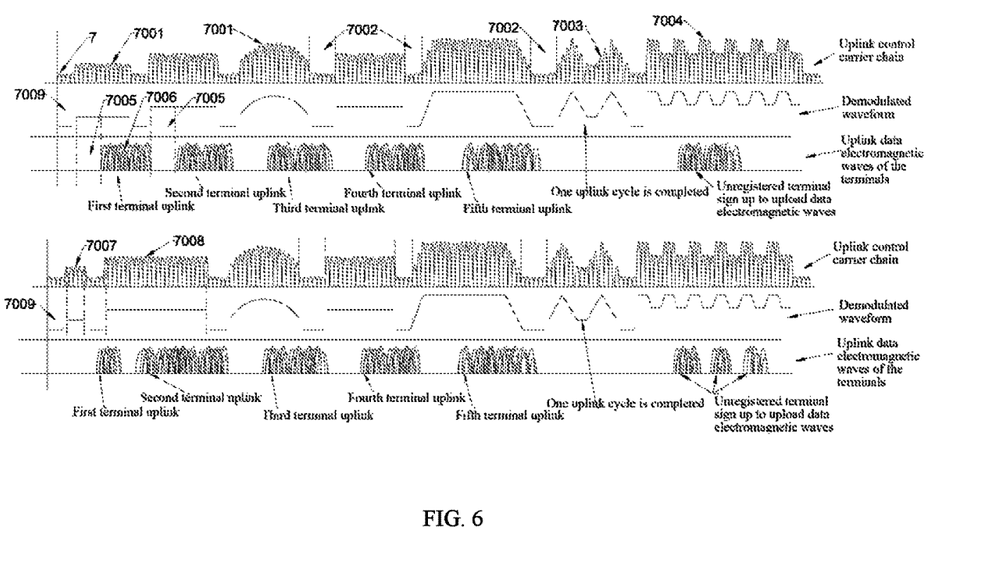
FIG. 6 is a schematic diagram of an uplink relationship between a carrier chain and a terminal according to the present invention.

As shown in FIG. 5 and FIG. 6, the uplink control carrier chain 7 is an electromagnetic wave with a fixed wavelength and frequency but an adjustable amplitude that is emitted from the service end to the terminals and received by the terminals, the uplink control carrier chain 7 includes the modulated waveform 7001, the uplink time interval waveform 7002, the special waveform at the end of the carrier chain 7003, the registration time interval waveform 7004, the uplink lag time period 7005, the uplink data electromagnetic wave chain of the mobile terminals 7006, the reduced time interval waveform 7007, the extended time interval waveform 7008, and the demodulated waveform 7009. The uplink control carrier chain 7 takes a horizontal axis as the time axis, the uplink control carrier chain 7 is arranged with the modulated waveform 7001. The electromagnetic wave amplitude of the modulated waveform 7001 is modulated by the modem into various waveforms with increased amplitude, and the uplink time interval waveform 7002 is arranged between the modulated waveforms 7001. The uplink time interval waveform 7002 is lengthened or shortened by the modem modulation based on the distance between the terminals and the satellite. The end of a cycle of the uplink control carrier chain 7 is arranged with the special waveform at the end of the carrier chain 7003. The registration time interval waveform 7004 is arranged after the special waveform at the end of the carrier chain 7003. When the terminals receive and synchronously demodulate the uniform data uplink time lag caused by the uplink control carrier chain 7 to form the uplink lag time period 7005, the terminals perform demodulation while receiving the uplink control carrier chain 7. The uplink lag time period 7005 is arranged above the synchronously demodulated waveform 7009 by the uplink data electromagnetic wave chain of the mobile terminals 7006, the reduced time interval waveform 7007 modulated by the service end due to decreased uplink data, and the extended time interval waveform 7008 modulated by the service end due to increased uplink data within a period of time after demodulation. The demodulated waveform 7009 is arranged below the uplink control carrier chain 7. The form of carrier chain is used to control the uplink sequence of each terminal. The uplink control carrier chain is composed of an electromagnetic wave with fixed frequency and wavelength but adjustable amplitude, and is always cyclically emitted and modulated by the modem into waveforms of various amplitudes. Each modulated waveform is the uplink time period of a terminal. A specific waveform is used to represent the beginning of a cycle, and a specific waveform is used to represent the registration period and the cycle end period. The registration period is a time period at the end of the carrier chain cycle. During this time period, all terminal devices that have not established a protocol to access the network can transmit their own factory-unique electromagnetic wave combination, and after the satellite receives all the unique electromagnetic wave combinations, it will automatically allocate them into groups according to the number of electromagnetic waves emitted simultaneously.

Initial communication and protocol establishment: at the end of a cycle of uplink control carrier, there will be a period of the uplink registration period. The mobile terminals emit the accompanying waves independently according to the combination of the accompanying waves arranged by the mobile terminals that was set by the manufactory during production and the surrounding electromagnetic wave frequency in this period, note that only the accompanying waves are emitted. After the satellite receives the emitted combination of the accompanying waves in this time period, it determines several combinations through detection. When the existing combination has been established, it removes the known combination. In the N amount of combinations that have not been established, several combinations are randomly found according to the length of the uplink control carrier cycle chain. According to the fixed parameters and encryption rules in the database, the communication confirmation and protocol are added to establish and complete the data in the downlink. The data includes information relating to the uplink time period of the terminals, that demodulation waveform that is the uplink control carrier in this time period, uplink time length, data validity period, etc. At the same time, the period of uplink control carrier chain is lengthened, alternatively, the modulation waveform is directly added to the blank waveform of uplink control carrier chain. When the terminal receives the data that accompanies the accompanying wave to which it belongs, it will decode the data according to its factory-set rules, and if it is solved, it will perform an uplink confirmation based on the parameters given by the satellite. When the satellite confirmation is completed, the establishment of the protocol is completed, and the terminal no longer emits the accompanying wave during the uplink registration period, instead, it performs uplink within the time period that is specified in the protocol. It only takes two uplink cycle to complete the initial communication at the beginning of a protocol to the completion of the protocol. However, the N terminals that have not been established will continue to emit accompanying wave registration during the uplink registration period. When a terminal does not have uplink data for a period of time, the satellite will cancel the protocol of this terminal according to the protocol rules, and change the waveform of the uplink time period corresponding to this terminal on the uplink control carrier chain (after the change, the terminal cannot uplink data according to the time period and waveform when the protocol is established, the protocol is terminated, and it is re-registered during the uplink registration period to wait for the establishment of the protocol), to allocate it to the subsequent terminal uplink data. In addition, an adaptive method can be used to increase the number and length of the carrier chain according to the number of terminals (when the number of the terminals on a chain reaches a certain number, either reduce the uplink time of all terminals per cycle, or increase the length of the entire carrier chain, which is equivalent to reducing the uplink speed per unit time, or adding another carrier chain and configure a new set of uplink data electromagnetic waves for this chain. The advantage of this is that it does not affect the uplink speed of each terminal). The uplink control carrier with a fixed frequency and wavelength is used to let the terminal determine the electromagnetic wave propagation attenuation, the emitter position, the relative velocity, and the distance. The Doppler effect calculation for a single known electromagnetic wave frequency is not only accurate, but also can reduce the calculation burden of terminal and reduce energy waste. The frequency and wavelength of the uplink control carrier chain in each area are different. When the terminal moves to an area, it can choose whether to replace a new carrier chain according to the received electromagnetic wave signal strength of different uplink control carrier chains. This can also effectively reduce the power consumption when the mobile terminal increases the uplink data due to the attenuation of the electromagnetic wave propagation in the carrier chain (increase the power of transmitting electromagnetic waves, and increase the power on the amplifying circuit on the modem to achieve better decoding, but more power consumption), which can also enable the mobile terminal to quickly replace data access points. When the mobile terminal moves from the service range of one ground data collection node to the service range of another ground data collection node, it automatically selects the carrier chain with stronger signal for network connection by comparing the signal strength of the uplink control carrier in the two areas. The combination of small accompanying waves is used to reject the data that cannot be emitted in the group emission. For example, the total accompanying waves are owned by all terminal equipment, but the combination of small accompanying waves is applied in the form of small array. Under normal circumstances, accompanying electromagnetic waves are not emitted according to the negative state, but if there are one or several combinations, thousands or tens of thousands of useful accompanying waves are associated, if this combination of accompanying waves is removed because of this, it will cause thousands or tens of thousands of useful accompanying waves to be re-transmitted in the next transmission period, thus reducing the total transmission rate. When using the small array combination of small accompanying waves, this method can be used when it is necessary to use some terminals. When emitting the accompanying waves, the corresponding combination of small accompanying waves is also emitted. When the equipment simultaneously receives its own combination of two small accompanying waves and the accompanying waves, the data electromagnetic wave with the accompanying waves is ignored directly.

Figure 7:
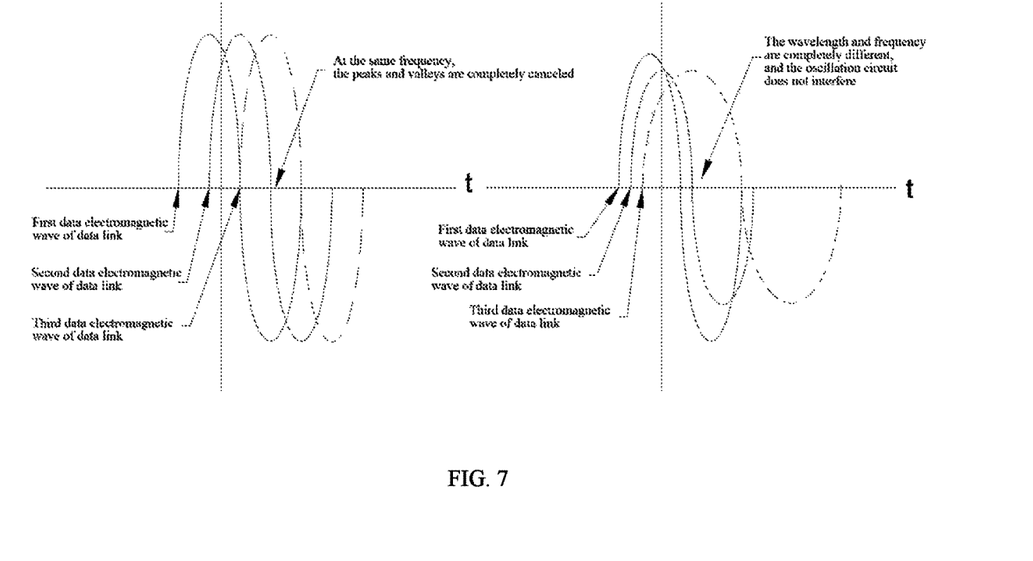
FIG. 7 is a schematic diagram of an electromagnetic wave superposed emission according to the present invention.

FIG. 7 shows the principle of electromagnetic wave superposed emission. As shown in the left of the FIG. 7, the first data electromagnetic wave, the second data electromagnetic wave, and the third data electromagnetic wave are all electromagnetic waves with the same wavelength and frequency. When they are continuously emitted with the same number, the peak and valley are eliminated, so it is difficult to detect and stack the limit. As shown in the right figure, the difference substitution or the position reference to electromagnetic wave chain is performed. The wavelength and frequency of the first data electromagnetic wave, the second data electromagnetic wave and the third data electromagnetic wave are not the same, so the limit stacking can be carried out, and the continuous emission can be carried out in less than one electromagnetic wave oscillation period, and the detection can be easily resolved. The most important thing is that the emission density is accumulated and the data transmission speed is increased.

Figure 8:
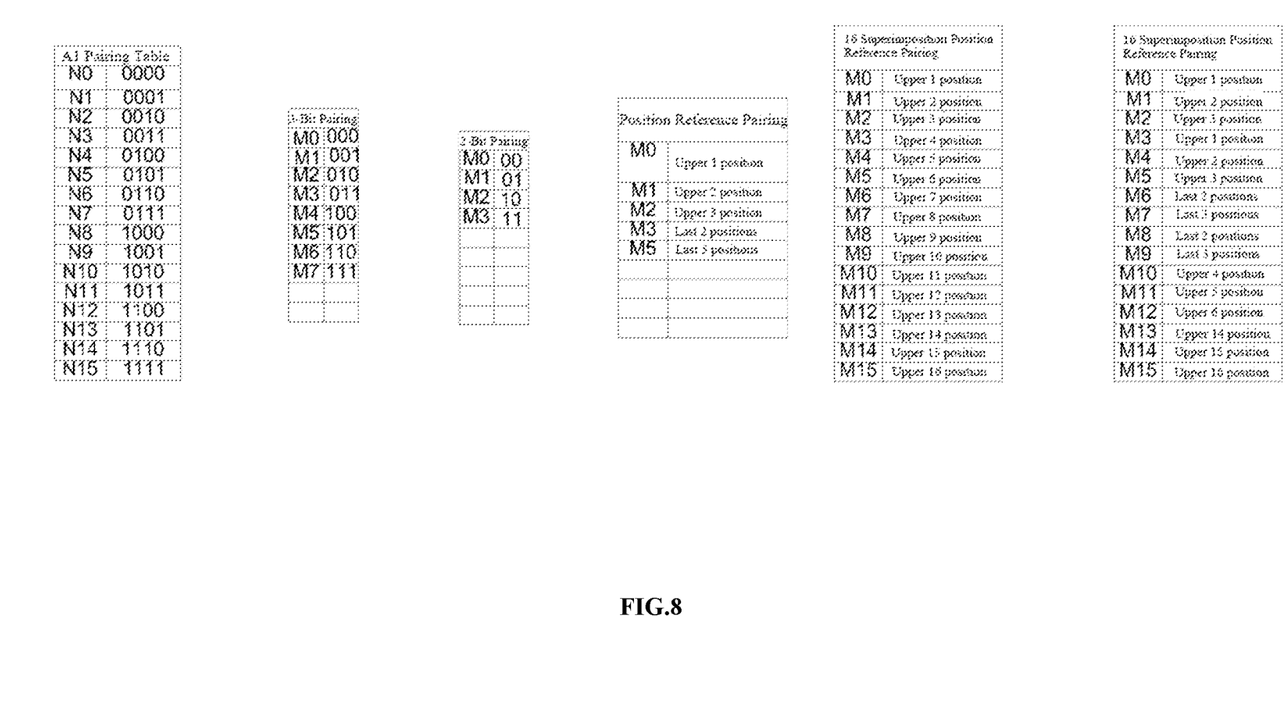
FIG. 8 is a comparison table of a normal data reference and a position reference according to the present invention.
Figure 9:
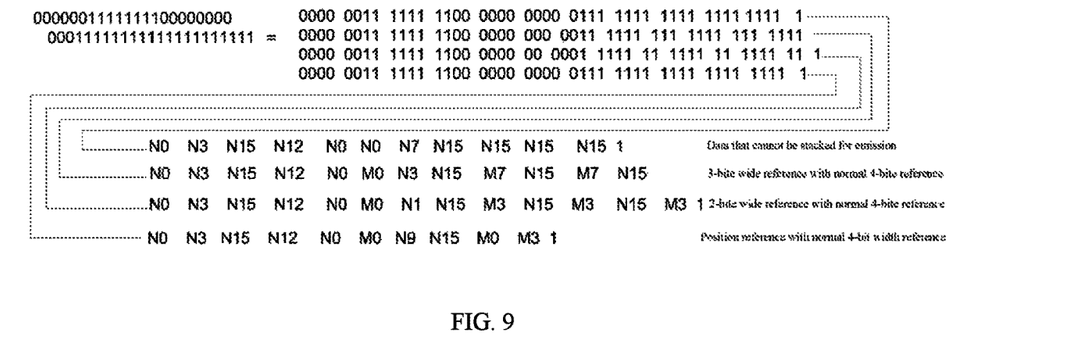
FIG. 9 is a schematic diagram of an embodiment corresponding to the reference according to the present invention.
Figure 10:
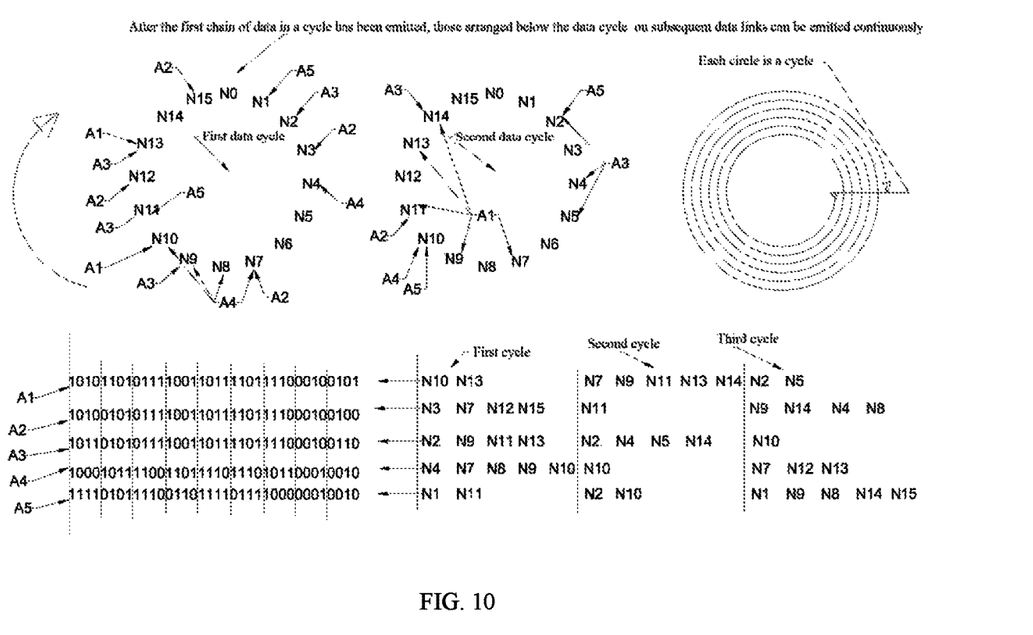
FIG. 10 is a schematic diagram of an electromagnetic wave emission using a cycle strategy according to the present invention.

As shown in FIG. 9, the corresponding examples of several references are shown. The data link position reference is used to reduce the peak and valley elimination caused by the data electromagnetic waves with the same frequency is superimposed and emitted. Yet, if electromagnetic waves with multiple frequencies are used to replace the same binary number, then the number of electromagnetic wave frequency groups that need to be superimposed on the number of times of with multiple emission will be needed. The use of the position reference only needs to increase the frequency of the electromagnetic wave with the number of superimposed emissions. For example, when using 256 electromagnetic waves to refer to 8-bit wide binary numbers, it takes 256*8=2048 electromagnetic wave frequencies to overlap and emit 8 times in one cycle to avoid the peak and valley cancellation caused by the same random frequency, and the use of the position reference only needs to increase 8 electromagnetic wave frequencies. In a cycle, when superimposing and transmitting 16 times, only using data referencing requires 256*16=4096 electromagnetic wave frequencies. When using position referencing, only 16 electromagnetic wave frequencies need to be added. The method of referring to two positions in FIG. 8 can increase the compression ratio and security of data. Similarly, the 3-bit-wide data reference and the two-bit-wide data reference as shown in FIG. 8 can also achieve the security and superposed emission times of the position reference but increase the number of electromagnetic wave emission per unit data volume.

Figure 11:
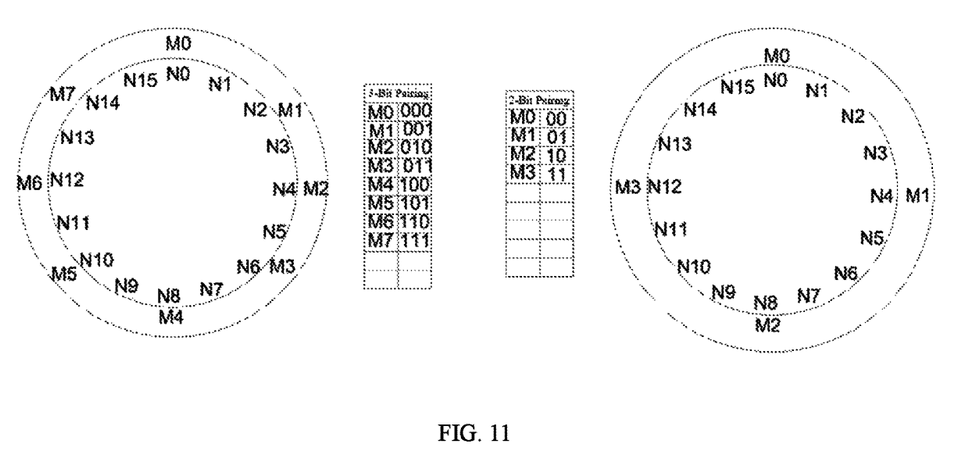
FIG. 11 is a diagram of a method for reducing the number of emission times of a reference bit width used for an old terminal according to the present invention.

As shown in FIG. 11, in view of the method of reducing the emission times of the reference bit width used by the old terminal, when the first unit performs receiving, the second unit automatically adjusts the receiving frequency band, and the third unit is ready to complete receiving. After the first unit completes receiving, it immediately starts to adjust the receiving frequency band to prepare to receive the fourth one. This method can reduce the number of receiving units on the client and increase the frequency accuracy. The number of data receiving units used in the data frequency band density is related to the accumulation degree of data emission. It can also be compatible with old equipment in the following ways. Although the main emitter is emitted in four 16 bits, for the old equipment, the data frequency band allocated is three 8 bits or two 4 bits for the period, so the frequency band can be allocated in the interval of 16 cycles.

Figure 12:
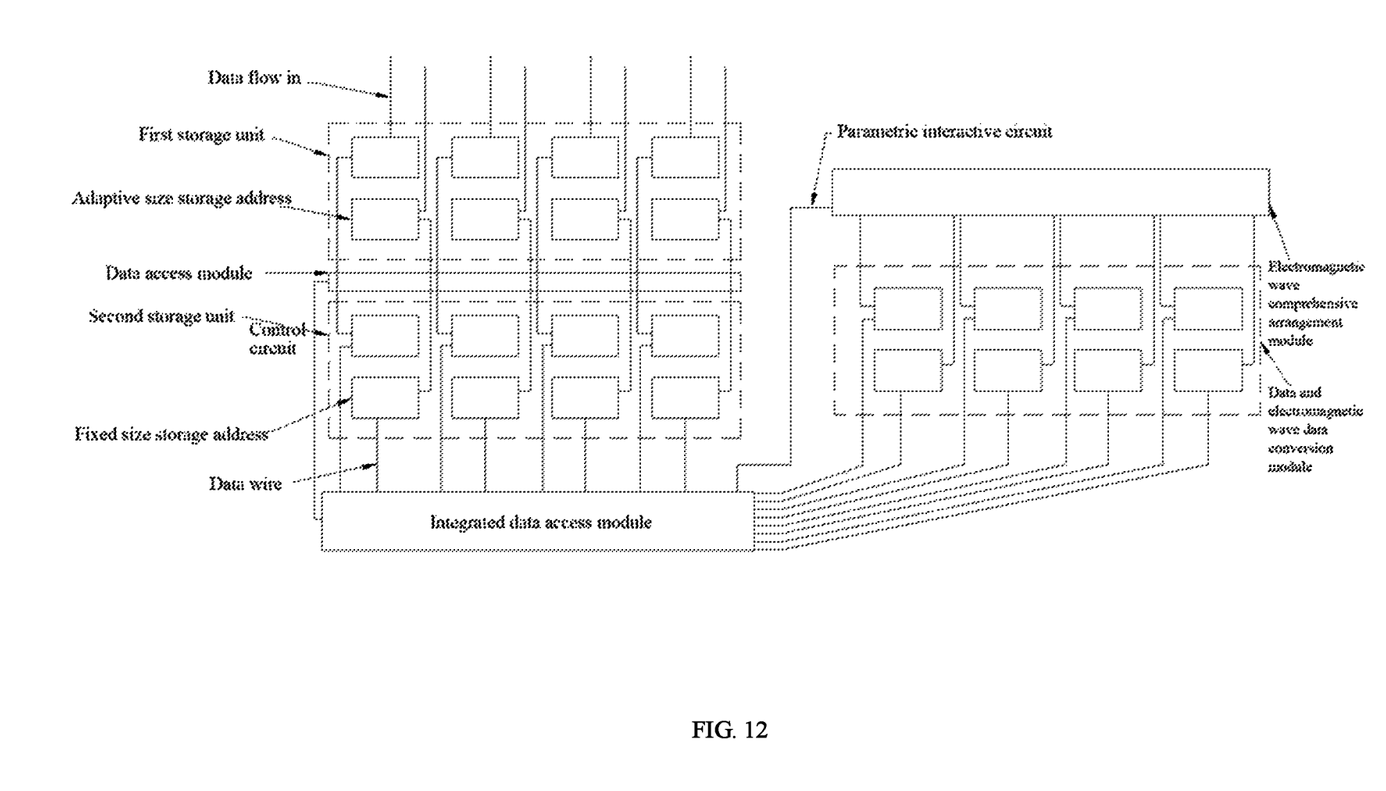
FIG. 12 is a diagram of a logical and physical structure of data collection and integrated emission of multiple terminals by a large data emission center according to the present invention.

As shown in FIG. 12, when a data emission center receives the data to be sent to multiple terminals, the data enters a first storage unit through a data inflow port for temporary storage. The data size in the first storage unit is automatically allocated according to the number of terminals owned and the respective data volume. A data access module is controlled by an integrated data access module by a control circuit, and the data access module is responsible for acquiring a certain amount of data of all the terminals. The terminal data volume in the second storage unit is of a uniform size. In order to ensure that the data transmission speed of each terminal is about the same, the data is acquired from the first storage unit only after the terminal data transmission in the second storage unit is completed in a time cycle. The acquisition rule of the integrated data access module is to acquire according to the priority of the time sequence. Acquired data enters a data and electromagnetic wave data conversion module for conversion and temporary storage, and at the same time flows into an electromagnetic wave comprehensive arrangement module. The electromagnetic wave comprehensive arrangement module eliminates all the same electromagnetic wave parameters according to all the converted electromagnetic wave parameters. Only one electromagnetic wave is reserved for each kind of electromagnetic wave. After all the electromagnetic wave data in the same time period are aggregated, according to the combination number of the accompanying electromagnetic wave data, the undesired combination is added to increase the corresponding electromagnetic wave with a small combination number. After all the electromagnetic wave data are imported into the emission module, one data transmission is completed. The electromagnetic wave comprehensive arrangement module sends interactive data to the integrated data access module, and the integrated data access module starts data acquisition process again according to the interactive data. The prevent invention integrates the single-to-single mode and single-to-multi mode in the prior art, aggregating the multi-terminal-to-multi-terminal data emission of the large data emission center; performing data processing at the logic level first, and then performing comprehensive emission to make the data transmission speed of all the terminals more balanced.

The working principle of the present invention is as follows:

The large-scale ground data center needs to relay the signal by the relay satellite 3 to send the data to the remote communication satellite 2, and the communication satellite 2 transmits the data to the ground service area. In order to reduce the interference in the process of magnetic wave transmission and improve the data transmission speed, an innovative solution is used on the relay satellite 3. The electromagnetic oscillation circuit 8002 of the receiving antenna unit directly divides a signal to the amplifying circuit of the electromagnetic oscillation circuit 8002 of the emitting antenna unit instead of transmitting the signal by the detection and control unit. The detection and control unit 8003 is only responsible for adjusting the oscillation frequency and oscillation amplitude of the electromagnetic oscillation circuit to maintain the stability of the output signal. While the ground data center and the relay satellite 3, the communication satellite 2 and the ground data collection node 5 always emit an electromagnetic wave with a fixed wavelength and frequency to each other to calculate the relative position, speed, and electromagnetic wave attenuation between each other, so as to calibrate the antenna and increase or decrease the emission power to ensure the stability of uplink and downlink data. At the same time, the independent combination of data magnetic wave is used between each of the two emitters, and the relay satellite 3 performs direct conversion and transmission on the combination of data magnetic wave without delay. After the intermediate data electromagnetic wave enters the communication satellite 2, the communication satellite 2 decodes and synchronously performs data transmission services to all mobile terminals 4 within the service range of the communication satellite 2001. The communication satellite 2 emits a periodic uplink control carrier chain 7 to the service range of the communication satellite 2001 to control the queuing of the mobile terminal's uplink data. In addition, the independent data electromagnetic wave emitting and receiving services are used for the ground data collection node 5. The ground data collection node 5 then provides the data services to all mobile terminals 4 within the service range of the ground data collection node 5001. The service mode is the same as the service mode of the communication satellite 2. Since the signal strength, calculated relative position and speed of uplink control carrier chain 7 of the ground data collection node 5 are better than those of the communication satellite 2, in general, the mobile terminals 4 automatically selects the ground data collection node 5 for data access.

It will be apparent to those skilled in the art that the present invention is not limited to the details of the exemplary embodiments described above and that the present invention can be embodied in other specific forms without departing from the spirit or essential characteristics thereof. The embodiments are therefore to be considered in all respects as illustrative and not restrictive, the scope of the present invention being defined by the appended claims rather than by the foregoing description, and all changes coming within the meaning and range of equivalency of the claims are therefore intended to be embraced therein. Any reference numerals in the claims shall not be construed as limiting the claim concerned.

Furthermore, it should be understood that although the specification is described in accordance with the embodiments, not each embodiment contains only one independent technical solution. This description of the specification is only for clarity. Those skilled in the art should take the specification as a whole, and the technical solutions in each embodiment can be appropriately combined to form other embodiments as would be understood by those skilled in the art.

What is claimed is:

1. A system for electromagnetic wave data transmission, comprising:
    a ground main information node, a communication satellite, a relay satellite, an uplink control carrier chain and a relay satellite antenna unit, wherein,
    the ground main information node is connected to an external network by a broadband cable, and the ground main information node is connected to the communication satellite by the relay satellite;
    the communication satellite comprises a service range of the communication satellite, and the communication satellite is separately connected to mobile terminals and a ground data collection node;
    the mobile terminals and the ground data collection node are arranged within the service range of the communication satellite, and the mobile terminals comprise data collection nodes; and
    the ground data collection node is arranged within a service range of the ground data collection node;
    wherein
    the ground data collection node uses an independent combination of electromagnetic waves to emit the electromagnetic waves to the mobile terminals, and the ground data collection node also uses the uplink control carrier chain to control uplink data of the mobile terminals, wherein the mobile terminals are within the service range of the ground data collection node within the service range of the communication satellite;
    at the same time, after the uplink data from the mobile terminals is received by the ground data collection node, the ground data collection node uses an independent set of the electromagnetic waves to emit the uplink data to the communication satellite, and the mobile terminals spontaneously form the data collection nodes, and the data collection nodes emit the data from the communication satellite to all of the mobile terminals; the data collection nodes only receive the uplink data of the terminal served and uses the independent set of electromagnetic waves to transmit the uplink data to the satellite after aggregation.

2. The system according to claim 1, wherein the relay satellite antenna unit externally receives the electromagnetic waves, and the relay satellite antenna unit comprises an antenna, an electromagnetic oscillation circuit, a detection and control unit and an electromagnetic signal transmission wire of the electromagnetic oscillation circuit.

3. The system according to claim 2, wherein the antenna is connected to the detection and control unit through the electromagnetic oscillation circuit; electromagnetic oscillation circuits in two of the relay satellite antenna units are connected by the electromagnetic signal transmission wire of the electromagnetic oscillation circuit.

4. A method using the system according to claim 1 for producing data transmission products.

5. The method according to claim 4, wherein the ground data collection node uses an independent combination of electromagnetic waves to emit the electromagnetic waves to the mobile terminals, and the ground data collection node also uses the uplink control carrier chain to control uplink data of the mobile terminals, wherein the mobile terminals are within the service range of the ground data collection node within the service range of the communication satellite; at the same time, after the uplink data from the mobile terminals is received by the ground data collection node, the ground data collection node uses an independent set of the electromagnetic waves to emit the uplink data to the communication satellite, and the mobile terminals spontaneously form the data collection nodes, and the data collection nodes emit the data from the communication satellite to all of the mobile terminals.

6. The method according to claim 5, wherein the relay satellite antenna unit externally receives the electromagnetic waves, and the relay satellite antenna unit comprises an antenna, an electromagnetic oscillation circuit, a detection and control unit and an electromagnetic signal transmission wire of the electromagnetic oscillation circuit.

7. The method according to claim 6, wherein the antenna is connected to the detection and control unit through the electromagnetic oscillation circuit; electromagnetic oscillation circuits in two of the relay satellite antenna units are connected by the electromagnetic signal transmission wire of the electromagnetic oscillation circuit.

8. The method according to claim 4, wherein the uplink control carrier chain comprises a modulated waveform, an uplink time interval waveform, a special waveform at an end of the carrier chain, a registration time interval waveform, an uplink lag time period, an uplink data electromagnetic wave chain of the mobile terminals, a reduced time interval waveform, an extended time interval waveform, and a demodulated waveform; wherein
the uplink control carrier chain takes a time axis as an emission sequence and a predetermined time as an emission period;
the uplink control carrier chain is arranged with the modulated waveform, an electromagnetic wave amplitude of the modulated waveform is modulated by a modem into a plurality of waveforms with increased amplitudes, and the uplink time interval waveform is arranged between the modulated waveforms;
an end of a cycle of the uplink control carrier chain is arranged with the special waveform at the end of the carrier chain, and the registration time interval waveform is arranged after the special waveform at the end of the carrier chain;
the mobile terminals receive and synchronously demodulate a uniform data uplink time lag, wherein the uniform data uplink time lag is caused by the uplink control carrier chain, and the uniform data uplink time lag forms the uplink lag time period of all the mobile terminals; and
the mobile terminals perform a demodulation while receiving the uplink control carrier chain;
a waveform and a duration of the uplink lag time period demodulated by the uplink data electromagnetic wave chain of the mobile terminals, the reduced time interval waveform due to decreased uplink data, and the extended time interval waveform due to increased uplink data within a period of time after demodulation are used to uplink the data.

9. A system for electromagnetic wave data transmission, comprising:
a ground main information node, a communication satellite, a relay satellite, an uplink control carrier chain and a relay satellite antenna unit, wherein,
the ground main information node is connected to an external network by a broadband cable, and the ground main information node is connected to the communication satellite by the relay satellite;
the communication satellite comprises a service range of the communication satellite, and the communication satellite is separately connected to mobile terminals and a ground data collection node;
the mobile terminals and the ground data collection node are arranged within the service range of the communication satellite, and the mobile terminals comprise data collection nodes; and
the ground data collection node is arranged within a service range of the ground data collection node;
wherein
the uplink control carrier chain comprises a modulated waveform, an uplink time interval waveform, a special waveform at an end of the carrier chain, a registration time interval waveform, an uplink lag time period, an uplink data electromagnetic wave chain of the mobile terminals, a reduced time interval waveform, an extended time interval waveform, and a demodulated waveform; wherein
the uplink control carrier chain takes a time axis as an emission sequence and a predetermined time as an emission period;
the uplink control carrier chain is arranged with the modulated waveform, an electromagnetic wave amplitude of the modulated waveform is modulated by a modem into a plurality of waveforms with increased amplitudes, and the uplink time interval waveform is arranged between the modulated waveforms;
an end of a cycle of the uplink control carrier chain is arranged with the special waveform at the end of the carrier chain, and the registration time interval waveform is arranged after the special waveform at the end of the carrier chain;
the mobile terminals receive and synchronously demodulate a uniform data uplink time lag, wherein the uniform data uplink time lag is caused by the uplink control carrier chain, and the uniform data uplink time lag forms the uplink lag time period of all the mobile terminals; and
the mobile terminals perform a demodulation while receiving the uplink control carrier chain;
a waveform and a duration of the uplink lag time period demodulated by the uplink data electromagnetic wave chain of the mobile terminals, the reduced time interval waveform due to decreased uplink data, and the extended time interval waveform due to increased uplink data within a period of time after demodulation are used to uplink the data.

10. A transmission method applied in a system for electromagnetic wave data transmission,
wherein the system for the electromagnetic wave data transmission comprises:
a ground main information node, a communication satellite, a relay satellite, an uplink control carrier chain and a relay satellite antenna unit, wherein,
the ground main information node is connected to an external network by a broadband cable, and the ground main information node is connected to the communication satellite by the relay satellite;

the communication satellite comprises a service range of the communication satellite, and the communication satellite is separately connected to mobile terminals and a ground data collection node;

the mobile terminals and the ground data collection node are arranged within the service range of the communication satellite, and the mobile terminals comprise data collection nodes; and the ground data collection node is arranged within a service range of the ground data collection node; and the transmission method comprises:

using the electromagnetic waves to refer to a position of a single group of the data on a data link; and using a plurality of accompanying waves, wherein the plurality of accompanying waves comprises a plurality of temporary accompanying waves.

11. The transmission method according to claim 10, wherein for an area of aggregated dense mobile terminals, a data forwarding protocol is used for data aggregation; when a predetermined number of the mobile terminals is reached, nodes are formed spontaneously and the nodes apply to the communication satellite for independent uplink data electromagnetic waves.

12. The transmission method according to claim 10, wherein a form of the uplink control carrier chain is used to control an uplink sequence of each of the mobile terminals;

the uplink control carrier chain is composed of an electromagnetic wave with a fixed frequency and a fixed wavelength, wherein the electromagnetic wave is always cyclically emitted, and the uplink control carrier chain is modulated by a modem into waveforms of a plurality of amplitudes;

each modulated waveform is an uplink time period of a terminal; a first specific waveform is used to represent a beginning, and a second specific waveform is used to represent a registration period and a cycle end period;

the uplink control carrier chain with the fixed frequency and the fixed wavelength is used to let the mobile terminals calculate electromagnetic wave propagation attenuation, an emitter position, a relative velocity and distance; and an adaptive method is used to increase a number and a length of the uplink control carrier chain according to a number of the mobile terminals, when the number of the mobile terminals on the uplink control carrier chain reaches a predetermined number, a new uplink control carrier chain is set up to control a new mobile terminal, and the new mobile terminal is allocated with a new uplink data electromagnetic wave.

13. The transmission method according to claim 12, wherein when a data emission center receives the data, wherein the data is to be sent to the mobile terminals, and the data enters a first storage unit through a data inflow port for a temporary storage;

a size of the data in the first storage unit is automatically allocated according to the number of the mobile terminals, wherein the mobile terminals are owned by the data emission center and a data volume of each of the mobile terminals;

a data access module is configured for fetching a predetermined amount of the data of all the mobile terminals;

a data volume of the mobile terminals in a second storage unit is of a uniform size, and the data is fetched from the first storage unit only after a terminal data transmission in the second storage unit is completed in a time cycle;

a fetching rule of an integrated data access module is to fetch according to a priority of a time sequence;

fetched data enters a data and electromagnetic wave data conversion module for a conversion and a temporary storage, and at the same time the fetched data flows into an electromagnetic wave comprehensive arrangement module; and the electromagnetic wave comprehensive arrangement module combines the electromagnetic waves to be emitted according to all converted electromagnetic wave parameters.

14. The transmission method according to claim 10, wherein the ground data collection node uses an independent combination of electromagnetic waves to emit the electromagnetic waves to the mobile terminals, and the ground data collection node also uses the uplink control carrier chain to control uplink data of the mobile terminals, wherein the mobile terminals are within the service range of the ground data collection node within the service range of the communication satellite; at the same time, after the uplink data from the mobile terminals is received by the ground data collection node, the ground data collection node uses an independent set of the electromagnetic waves to emit the uplink data to the communication satellite, and the mobile terminals spontaneously form the data collection nodes, and the data collection nodes emit the data from the communication satellite to all of the mobile terminals.

15. The transmission method according to claim 14, wherein the relay satellite antenna unit externally receives the electromagnetic waves, and the relay satellite antenna unit comprises an antenna, an electromagnetic oscillation circuit, a detection and control unit and an electromagnetic signal transmission wire of the electromagnetic oscillation circuit.

16. The transmission method according to claim 15, wherein the antenna is connected to the detection and control unit through the electromagnetic oscillation circuit; electromagnetic oscillation circuits in two of the relay satellite antenna units are connected by the electromagnetic signal transmission wire of the electromagnetic oscillation circuit.

17. The transmission method according to claim 10, wherein the uplink control carrier chain comprises a modulated waveform, an uplink time interval waveform, a special waveform at an end of the carrier chain, a registration time interval waveform, an uplink lag time period, an uplink data electromagnetic wave chain of the mobile terminals, a reduced time interval waveform, an extended time interval waveform, and a demodulated waveform; wherein the uplink control carrier chain takes a time axis as an emission sequence and a predetermined time as an emission period;

the uplink control carrier chain is arranged with the modulated waveform, an electromagnetic wave amplitude of the modulated waveform is modulated by a modem into a plurality of waveforms with increased amplitudes, and the uplink time interval waveform is arranged between the modulated waveforms;

an end of a cycle of the uplink control carrier chain is arranged with the special waveform at the end of the carrier chain, and the registration time interval waveform is arranged after the special waveform at the end of the carrier chain;

the mobile terminals receive and synchronously demodulate a uniform data uplink time lag, wherein the uniform data uplink time lag is caused by the uplink control carrier chain, and the uniform data uplink time lag forms the uplink lag time period of all the mobile terminals; and the mobile terminals perform a demodulation while receiving the uplink control carrier chain;

a waveform and a duration of the uplink lag time period demodulated by the uplink data electromagnetic wave chain of the mobile terminals, the reduced time interval waveform due to decreased uplink data, and the extended time interval waveform due to increased uplink data within a period of time after demodulation are used to uplink the data.

* * * * *